Sept. 10, 1963   R. O. KUTSCHE   3,103,230
PRESSURE REGULATOR WITH DAMPING MEANS
Filed Sept. 2, 1960
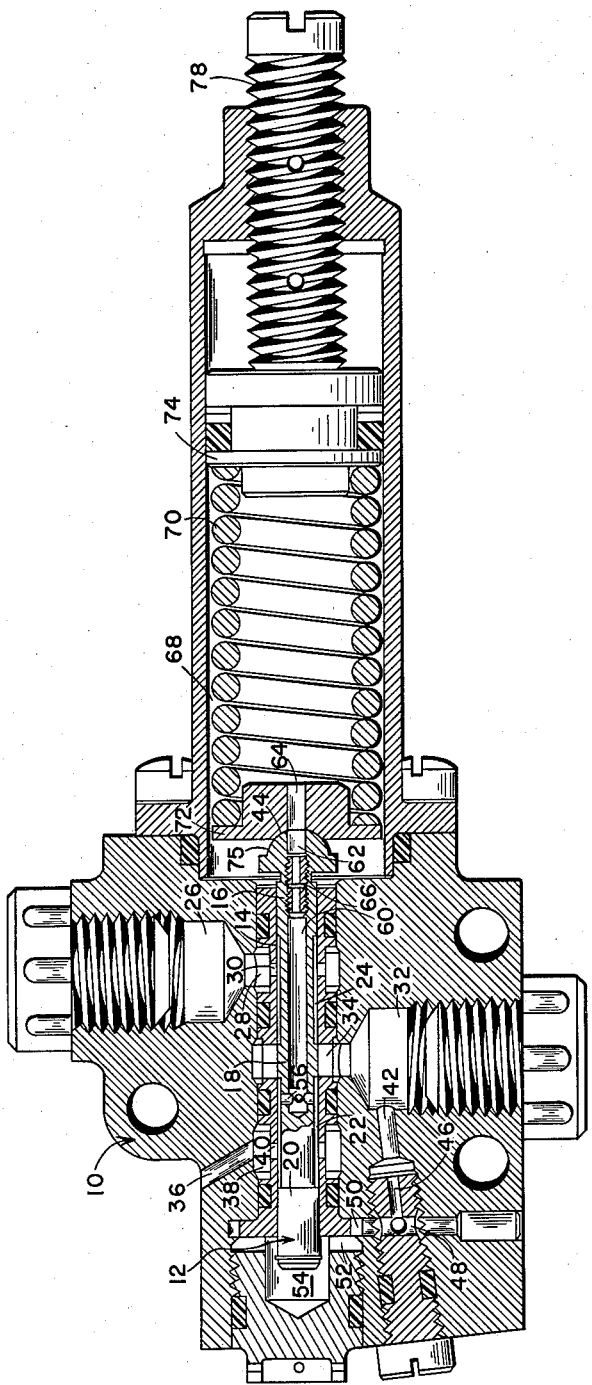
INVENTOR.
ROBERT O. KUTSCHE
BY Ernest L. Brown
ATTORNEY

United States Patent Office 3,103,230
Patented Sept. 10, 1963

3,103,230
PRESSURE REGULATOR WITH DAMPING MEANS
Robert O. Kutsche, Grand Rapids, Mich., assignor, by mesne assignments, to Lear, Siegler, Inc., a corporation of Delaware
Filed Sept. 2, 1960, Ser. No. 53,836
4 Claims. (Cl. 137—116.3)

This invention pertains to means for regulating the pressure in a pneumatic or hydraulic line, and more particularly to a pressure regulator which is adapted to maintain pneumatic or hydraulic pressure substantially constant over a wide range of flow values.

Heretofore known pressure regulators tend to oscillate. Further, when a force balance principle is utilized, prior known pressure regulators tend to cock the valve spool thereby reducing the sensitivity of the valve.

The demand pressure regulator of this invention utilizes a spool valve, wherein a force balance principle is utilized and wherein the forces are exerted along the axis of the spool. Further, the spool valve utilized in this invention is internally dampened to prevent the valve from oscillating.

It is therefore an object of this invention to provide a novel pressure regulator.

It is another object of this invention to provide a novel pressure regulator which utilizes a force balance principle.

It is a further object of this invention to provide a novel demand pressure regulator which utilizes a spool valve which is force balanced with the forces directed along the axis of the spool.

It is a more particular object of this invention to provide a demand pressure regulator for pneumatic or hydraulic systems which utilizes a spool valve wherein the forces are balanced along the axis of the spool and wherein the spool is internally dampened.

Other objects will become apparent from the following description taken in connection with the accompanying drawing which shows the device of this invention partially in profile and partially in section.

In the FIGURE, housing 10 encloses a spool 12 for sliding motion within a bore 14.

Spool member 12 has lands at 16, 18 and 20 which separate cylindrical chambers 54, 22, 24 and 68.

Input port 26 is connected through conduits 28 and 30 to chamber 24. Output conduit 32 is connected through conduit 34 to bore 14 adjacent land 18. Output conduit or port 32 is also connected through conduit 42, orifice 46, conduit 48, annular chamber 50 and chamber 52, to pressure chamber 54. Return port 36 is connected to an outside conventional reservoir (not shown) and to chamber 38 in turn connecting to chamber 22 through conduit 40.

Chamber 22 is connected through conduits 56 and 60, orifice 66 and conduits 62 and 64 to spring chamber 68. Spring 70 within spring chamber 68 is positioned between spring shoulder 72 and spring shoulder 74. Spring shoulder 72, by means of socket 44 is positioned to bear upon ball member 75, which is a part of piston 12. The compression of spring 70 is controlled by screw means 78 positioned between housing 10 and shoulder 74.

If spring 70 were merely connected to piston 12, it would tend to cock piston 12 by exerting components of force normal to the axis thereof. However, in the device of this invention, ball 75 and socket 44 connect spring 70 to spool 12, thereby permitting only axial forces to be applied thereto. Thereby, it is possible to avoid cocking of spool 12 and consequent binding in its axial travel as it maintains the desired pressure in the output port 32.

To operate as a demand pressure regulator, the pneumatic or hydraulic fluid input to port 26 must be under a pressure greater than or equal to the pressure to be maintained in the output port 32, and the pressure to be maintained in the output port 32 must exceed the return pressure. Obviously, the various conduits and chambers in housing 10, as detailed above, are completely filled with pneumatic or hydraulic fluid. Under stable conditions, the pressure in input port 26 and chamber 24 are equal, also the pressure in the output port 32 and chamber 54 are equal. The fluid in the return port 36 and that in spring chamber 68 are equal to the return pressure.

To set the regulator to maintain a given pressure in the output port 32, the screw 78 is adjusted to bias spool 12 by means of the spring 70 through socket 44 and ball 75 until a reading of the desired pressure is obtained on an indicator or like device connected in the output port 32 circuit. The bias operating against the fluid pressure in chamber 54 will in turn position the spool 12 for incremental fluid flow from input port 26 to output port 32 through chamber 24 to maintain that pressure. When a steady reading or stable condition is obtained, a balance of forces exists between that imposed by spring 70 and that exerted by the fluid pressure in chamber 54 against the end of spool 12.

When pressure in output port 32, and consequently in chamber 54, exceeds the pressure to be maintained, e.g., caused by a decreased demand of fluid flow, the force exerted by the fluid pressure in chamber 54 against the end of spool 12 will exceed the bias of spring 70 and consequently move spool 12 to the right. This movement increases the bias of spring 70 and reduces the opening afforded between land 18 and conduit 34. The reduced opening increases the pressure drop between chamber 24 and conduit 34 and results in decreasing the pressure in output port 32, and consequently in chamber 54, until a stabilized condition again exists, i.e., the opposing forces on the floating spool 12 are balanced and the pressure in output port 32 is again at the pre-set value.

Also, it is possible to reduce the pressure in output port 32, and consequently in chamber 54, when the travel of spool 12 is of such nature as to locate land 18 to connect conduit 34 with chamber 22 and permit a reverse flow of fluid from output port 32 to the reservoir (not shown) connected to return port 36. In this manner it is possible to reduce the pressure in output port 36 when a reverse fluid flow condition exists.

In the event the pressure in output port 32, and consequently in chamber 54, is less than the pressure to be maintained, e.g., caused by an increased demand of fluid flow, the force exerted by spring 70 will exceed the force exerted by the fluid pressure in chamber 54 against the end of spool 12 and consequently move spool 12 to the left. This movement decreases the bias due to spring 70 and increases the opening afforded between land 18 and conduit 34. The increased opening decreases the pressure drop between chamber 24 and conduit 34 and results in increasing the pressure in output port 32, and consequently chamber 54, until a stabilized condition again exists and the pressure in output port 32 returns to the pre-set value.

It is to be noted that the equalization of pressure in output port 32 and chamber 54 is through orifice 46 and its associated passages.

The movement of spool 12 in either direction in bore 14 of housing 10 will serve to induce fluid flow in spring chamber 68 and chamber 54.

The displacement of fluid out of spring chamber 68 forces fluid flow through orifice 66 and into the reservoir connected to return port 36. Conversely, the addition of fluid to spring chamber 68 from the reservoir connected to return port 36, due to the partial vacuum created by the retraction of spool 12 from that chamber, must flow through orifice 66.

Simultaneously with the displacement of fluid from spring chamber 68, fluid will flow into chamber 54 from output port 32 by way of orifice 46 as a consequence of the partial vacuum created by the retraction of spool 12 therefrom. Simultaneously with the addition of fluid to spring chamber 68, fluid will be displaced from chamber 54 into output port 32 by way of orifice 46.

The restriction to fluid flow afforded by the orifices 46 and 66 relative to flow in the associated conduits and chambers, serves to dampen axial oscillations of spool 12 about the aforementioned stabilized condition. This is accomplished by the build-up of pressure upstream of the orifice, thereby impeding the flow of fluid therethrough. The impedance to flow induced by the individual orifices is additive in each direction of movement of spool 12.

Thus the device of this invention is non-oscillating pressure regulator which is adapted to be adjusted to control the output hydraulic or pneumatic pressure at a predetermined value without fluctuation or oscillations thereof.

Although the device of this invention has been described in detail above it is not intended that the invention should be limited thereby but only in accordance with the spirit and scope of the appended claims.

What is claimed is:

1. A demand pressure regulator comprising a housing having a supply port, a controlled pressure port and a return port, all in communication with an internal axially extending chamber having opposed closed ends, the controlled pressure port and one of said closed ends of the chamber of said housing connected separately through a restrictive fluid passage; a spool valve adapted to slide in the chamber of said housing having its peripheral surface so formed as to define a passage between the supply and controlled pressure ports of said housing upon travel in one direction and a passage between the return and controlled pressure ports of said housing upon travel in the other direction, said spool valve also containing an internal axially extending chamber connected to the return port of said housing and also having a restrictive fluid passage; an adjustable force means biasing the spool valve in said one direction attached by a universal connection, to the said spool valve, contained in the other of said closed ends of the internal chamber of said housing connected to the return port by means of the internal chamber in the said spool valve; whereby a given pressure can be maintained in the said controlled pressure port over an appreciable fluid flow range and oscillation in the selective positioning of said spool valve as a result of the interaction between the adjustable force means at one end and the fluid pressure contained in the other closed end of the internal chamber of said housing, is dampened by the coaction of the two restrictive fluid passages of the said spool valve and said housing respectively.

2. A demand pressure regulator comprising a housing having a supply port, controlled pressure and return ports communicating with an internal chamber having opposed closed ends, the controlled pressure port and one of said closed ends of the chamber separately connected through a restrictive fluid passage; a valve adapted to be positioned in the chamber of said container having a surface so formed as to selectively define distinct and separate connection between the supply and controlled pressure ports for one position of said valve and a connection between the return and controlled pressure ports of the said container for a different position thereof, said valve having an internal chamber containing a restrictive fluid passage; an adjustable spring means biasing said valve toward said one position contained in the other of said closed ends of the chamber of said housing and attached universally to the said valve; the return port of said housing, the chamber of the said valve and the chamber containing the said adjustable spring means forming a continuous fluid passage; wherein the impedance to fluid flow in the passage connecting the return port with the chamber end of said housing containing the said adjustable spring means and the impedance to fluid flow between the controlled pressure port and the opposite chamber end of said container combine to prevent axial oscillations of the valve in seeking a stabilized position determined by the balance of the force imposed at either end of the said valve.

3. A demand pressure regulator comprising a housing containing a supply port, a controlled pressure port and a return port, all in communication with an internal chamber therein having opposed closed ends, the controlled pressure port and one of said closed ends of the chamber of said housing separately connected by a restrictive fluid passage; a spool valve adapted to slide in the chamber of said housing having its peripheral surface so formed as to selectively define a passage between the supply and controlled pressure ports upon travel of the said spool valve in one direction and a passage between the return and controlled pressure ports of said housing upon travel of said spool valve in the other direction, said spool valve also having an internal axially extending chamber connected with the return port of said housing and containing a restrictive fluid passage; an adjustable force means biasing the spool valve in said one direction attached by a universal connection to the said spool valve, the universal connection to said spool valve consisting of a socket member and ball member joint, the said ball member being attached to a part of the said spool valve and the socket member operatively connected to the said adjustable force means and bearing upon the said ball member; wherein both the total impedance to fluid flow afforded by the two restrictive passages to prevent axial oscillation of the said spool valve in seeking a given force balanced stabilized condition and the elimination of force components in other than the axial direction of the said spool valve by the ball and socket joint afford a sensitive and stable response by the said spool valve to maintain a given pressure in the said controlled pressure port.

4. In combination: a housing having a supply port, controlled pressure port and return port, all in communication with an internal chamber therein having opposed closed ends, said housing having a separate connection through a restrictive passage from said chamber to the controlled pressure port; a slide valve adapted for axial movement in the chamber to selectively define distinct and separate passages between the supply and controlled pressure ports and between the return and controlled pressure ports of said housing upon travel in certain directions by the said slide valve; the said slide valve also having an internal chamber containing a restrictive fluid passage; an adjustable spring means attached by means of a universal connection to the said slide valve and biasing said slide valve in a direction to effect the opening of said passage therein between said supply and controlled pressure ports, said spring means being contained in one end of the internal chamber of the said housing, the end of the internal chamber of said housing retaining the said spring means being connected to the return port by means of the said restrictive fluid passage contained in the internal chamber of the said slide valve; wherein the said slide valve is balanced between the force imposed by the adjustable spring means at the said one end and at the other of said closed ends by the force imposed by the fluid pressure in the other of said closed ends of the said chamber of the said housing which is connected by a separate passage to the controlled pressure port.

References Cited in the file of this patent

UNITED STATES PATENTS

| | | |
|---|---|---|
| 2,105,876 | Birch | Jan. 18, 1938 |
| 2,167,328 | Beggs | July 25, 1939 |
| 2,950,730 | Svenson | Aug. 30, 1960 |
| 2,963,040 | Zimmer | Dec. 9, 1960 |
| 2,982,294 | Koutnik | May 2, 1961 |